United States Patent [19]

Capitini et al.

[11] 4,329,048
[45] May 11, 1982

[54] LIGHT ABSORPTION SPECTRUM ANALYZER

[75] Inventors: Robert Capitini, Le Perreux; Paul Roveyaz, Cambes, both of France

[73] Assignee: Commissariat a l'Energie Atomique, Paris, France

[21] Appl. No.: 129,203

[22] Filed: Mar. 11, 1980

[30] Foreign Application Priority Data

Mar. 15, 1979 [FR] France ................. 79 06597

[51] Int. Cl.³ .................... G01N 21/85; G01N 21/05; G01J 3/42; G01J 3/48
[52] U.S. Cl. ...................................... 356/73; 356/323; 356/408; 356/410; 356/411; 356/414; 356/419; 356/434
[58] Field of Search ................. 356/73, 320, 323, 324, 356/325, 408, 410, 411, 414, 416, 419, 425, 434

[56] References Cited

U.S. PATENT DOCUMENTS

| | | | |
|---|---|---|---|
| 2,679,010 | 5/1954 | Luft | 356/323 |
| 2,875,666 | 3/1959 | Parker et al. | 356/73 |
| 2,930,279 | 3/1960 | Martin | 356/325 |
| 3,259,465 | 7/1966 | Sheen | 356/411 |
| 3,569,696 | 3/1971 | Karlson | 356/434 |
| 3,941,487 | 3/1976 | Ehret et al. | 356/411 |
| 4,248,536 | 2/1981 | Hijikata | 356/434 |

FOREIGN PATENT DOCUMENTS

2201384  8/1972  Fed. Rep. of Germany ...... 356/323

*Primary Examiner*—Vincent P. McGraw
*Attorney, Agent, or Firm*—Kerkam, Stowell, Kondracki & Clarke

[57] ABSTRACT

Spectrum analyzer for the light absorption of a solution comprising a small transparent measuring cell containing the solution; a light source; means for dividing the beam of light of the source into two beams, one being the reference beam and the other the measuring beam transmitted respectively to a reference absorber element and to the measuring cell; means for selecting the measuring wavelength; means for modulating the reference and measuring beams which have respectively traversed the absorber element and the measuring cell; means for detecting the energies of each of the modulating beams after they have traversed the reference absorber element and the sample; the modulation means comprising alternate transparent and bireflecting sectors in front of each of the beams which have passed through the reference absorber and the measuring cell, said sectors being associated with means for selecting the wavelength of the beams in such a way that, as a function of the successive positions of the sectors relative to the beams, the detection means alternately receive the light transmitted by the sample and that transmitted by the absorber, the latter being such that it can independently absorb radiations of different wavelengths transmitted by the source and corresponding to the wavelength of the radiations absorbed by the components of the solution, means for comparing the energies of the modulated beams connected to detection means, wherein the modulation means are positioned directly behind the cell along the path of the divided measuring beam and immediately behind the absorber element on the path of the reference beam, the means for dividing the beam of the source being arranged in such a way that the measuring beam is converged on the cell.

19 Claims, 8 Drawing Figures

LIGHT ABSORPTION SPECTRUM ANALYZER

BACKGROUND OF THE INVENTION

The present invention relates to a spectrum analyser of the light absorption of a solution, particularly for simultaneously dosing a number of compounds dissolved in a solvent, such as for example blood. In this specific medical problem, the measurement of the water exchanged in the organs and particularly in the lungs makes it possible to diagnose the size of edemas in patients and the degree of shock in the victims of accidents.

The presently used method consists of injecting into a vessel upstream of the organ a small amount of heavy water which has been made tonic, i.e. biologically compatible by adding chemical salts and containing a dye such as indocyanine green and then measuring in the blood downstream and as a function of time the concentration leaving the said two substances. In this way, two elution curves are obtained, each having a rapid rise, followed by a slower fall. The capillary walls are impermeable to the dye, but the heavy water passes through them and is exchanged with the water in the tissues, which delays the development of its elution curve compared with that of the indocyanine. The utilization of this difference between the two curves makes it possible to calculate the exchangeable water mass in the organ being studied.

In this special application, it is known to use two independent apparatuses (spectrometers or colorimeters) arranged in series, one for dosing the indocyanine green to 0.8 micron in the very near infrared region and the other for dosing the heavy water in the infrared region at 4 microns.

Spectrometers used for measurements in the visible and infrared regions comprise a light source (tungsten filament lamp or gas lamp for the visible range and incandescent solid source for the infrared), a dispersion system (prism or network) and a detector which is sensitive on the range of wavelengths for which the apparatus was designed (photomultiplier for the visible range and thermal receiver for the infrared). The sample contained in a transparent cell, when a liquid is used, is placed either between the source and the dispersion system (general case in infrared spectrometers) or between the dispersion system and the detector (general case) invisible or ultraviolet spectrometers. Appropriate electromechanical systems make it possible to pass the dispersed light to the detector and record the amplified response of the latter. Measurements carried out with an without a fitted sample make it possible to determine the absorption spectrum of the latter.

In the case where the application is limited to measurements with a single wavelength, simpler instruments (colorimeters) carrying interferential or other filters instead of the dispersion system can be used.

From the quantitative standpoint, the transmission T of the sample at a given wavelength $\lambda$ is equal to $I/I_O$, $I_O$ being the incident light intensity on the sample and $I$ the transmitted intensity. Absorption is equal to $(I_O - I)/I_O$.

The absorbance A or optical density d is the logarithm of the inverse of the transmission:

$$A = d = \text{Log}(1/T) = \text{Log}(I_O/I)$$

At present, there are two different types of spectrometers making it possible to measure T and/or d and also they differ as regards their complexity and in the precision of measurement which they can provide.

One of these spectrometers operates with a single beam and the other with two beams.

(a) Single beam spectrometers make it possible to determine the transmission T on the basis of two consecutive measurements. The first measurement, that of $I_O$ is carried out without a sample to be analysed. The second measurement is performed after introducing the sample into the beam. The transmission T is determined for each wavelength of the spectrum and the precision obtained on T is dependent on the conditions under which these two consecutive measurements were performed. Thus, during the measurements there can be variations in the stability of the source, the sensitivity of the receiver, the composition of the atmosphere and the amplification factors of the different components of the apparatus and each of these variations in a source of error. Moreover, the receiver and the amplifier must have linear transformation characteristics, as well as a constant response throughout the measurement. These conditions are difficult to respect and in addition such spectrometers are not very convenient.

(b) In double beam spectrometry, the radiation transmitted by the sources is divided before or after dispersion into two identical beams which pass through the sample and a reference control element of the same time. After passage through the sample and the reference element, the transmitted energies are measured over very short periods, which correspond to the modulation frequency of the beams by means of reflecting or non-reflecting sectors moving in such a way as to intersect the two beams. The transmitted energy is measured on the basis of detectors located on the path of the transmitted beam and said detectors make it possible to measure an energy difference corresponding to the more or less large light absorption of the sample. At the output of the detectors, an electromotive force appears, which varies periodically as a function of a multiple of the displacement frequency of the reflecting and non-reflecting sectors. Thus, an alternating current whose magnitude and phase correspond to the energy difference between the two beams circulates in the detection circuit.

As a function of the absorption value of the sample, it is often necessary to compensate the intensity of the reference beam, said compensation being of two types:

Optical compensation in which a comb or wedge-shaped diaphragm is used, whose displacement controls the response of the recorder indicating the transmission of the sample as a percentage. In this type of compensation, the photometric recording quality is dependent on the linearity of the response of the compensation diaphragm.

Electronic compensation in which the two beams are compared electronically. The intensity of the reference beam is fixed at a constant value by means of a servomotor which controls the opening of the corresponding diaphragm. In this case, the transmitted intensity I is proportional to T and can be directly recorded.

An apparatus of the type described hereinbefore has the disadvantage of not permitting individually the simultaneous determinations of a number of components contained in the same sample and in different wavelength ranges. This is for example the case with simultaneous dosages of uranium hexafluoride and chlorine trifluoride or of water and carbon dioxide. They also do not now permit the simultaneous determination of heavy water at 4 microns and idocyanine green at 0.8 micron in the blood, which itself has a very high absorption in these ranges.

A double beam apparatus especially designed for measurements at the two above wavelengths could be used for dosing the heavy water and then the indocyanine with reference to blood, but not simultaneously. This is a serious disadvantage when it is desired to compare the elution curves of these two products simultaneously injected upstream of the observation point. In this case, it is necessary to design an apparatus which can operate at the two wavelengths chosen, but this leads to a large number of problems which are difficult to overcome and resulting in particular from two factors. The first is the considerable difference in the wavelength necessary for dosing the two products in question (0.8 and 4 microns respectively) and the second is the very high absorption of the blood at these two wavelengths.

In order to solve the problem of dosing two components, bearing in mind the disadvantages referred to hereinbefore, it is standard practice to use dosing apparatuses, such as spectrometers or colorimeters coupled in series. The imprecision of measurement when using such apparatuses is increased by the fact that it is necessary to use two measuring cells, interconnected for example by a flexible tube. Moreover, the dimensions of the cells to be used are linked with the optical and electronic characteristics of the apparatuses chosen, so that great differences in these dimensions can deform the elution curves with respect to one another. Thus, the use of two series-arranged apparatuses with two cells of different dimensions, connected by a flexible tube make it difficult to establish a common time base with the considerable precision required for kinetic studies.

However, the sensitivity and precision of measurement of such apparatuses, taken individually, may be able to satisfy the requirements of the problem, i.e. the measurement of small variations on an intense absorption background as a result of the choice of sources and detectors having better performances at the selected wavelengths.

In the case of detectors, the problem is solved relatively well by choosing, for example, selenium pyroelectric elements. As this type of detector has in practice the same specific detectivity between 0.2 and 35 microns, it can be used both for measurements in the visible region and in the infrared region.

The problem is more complicated in the case of light sources. Thus, the intensity and transmission range vary with the type of source selected. It is possible to select incandescent sources using aluminium oxide-based ceramic materials, whose operating temperatures are between 1500° and 1800° K. and whose emissivity values differ relatively greatly from those of the black body for very near and far infrared. It is also possible to use tungsten filament lamps for the visible range and hydrogen and deuterium spectral lamps for the ultraviolet.

These briefly reported choices make it possible to improve the sensitivity and precision of the measuring apparatus, but the problem still exists when it is a question of following the time evolution of the concentration of each of the components and of comparing their elution curve. Thus, the solution consisting of connecting apparatuses in series has very serious practical difficulties particularly as a result of using separate cells.

Frequently in known double beam spectrometers, the light energy concentration on the solution to be analysed is low due to the arrangement of the input mirrors making it possible to divide the beam transmitted by the source and of the arrangement of modulation means for the divided beams with respect to the cell or the container containing the solution to be analysed. Usually, these arrangements are such that it is necessary to place between the different organs means for deflecting the optical paths of the two beams, such as for example mirrors.

BRIEF SUMMARY OF THE INVENTION

The problem of the present invention is to obviate these disadvantages and in particular to provide a spectrum analyser which can operate at different wavelengths, without it being necessary to provide a plurality of cells for containing the solution or to use different sources. This analyser can be used in the entire optical electromagnetic radiation range and in particular in the infrared. It makes it possible to simultaneously dose or determine a plurality of components in a single cell, combined with the advantages of a spectrometer with several beams and those of a colorimetric dosing apparatus. It has a very simple design and can be realised with existing technical means. Finally, this double beam analyser is highly luminous and makes it possible to very accurately analyse solutions having high optical densities. This high luminosity is obtained due to the relative positions of the cell containing the sample and of the means for modulating the divided beams. It also results from the fact that the measuring beam converges totally on the active part of a measuring cell of limited thickness.

The invention relates to a spectrum analyser for the light absorption of a solution comprising a small transparent measuring cell containing the solution; a light source; means for dividing the beam of light of the source into two beams, one being the reference beam and the other the measuring beam transmitted respectively to a reference absorber element and to the measuring cell; means for selecting the measuring wavelength; means for modulating the reference and measuring beams which have respectively traversed the absorber element and the measuring cell; means for detecting the energies of each of the modulating beams after they have traversed the reference absorber element and the sample; the modulation means comprising alternate transparent and bireflecting sectors in front of each of the beams which have passed through the reference absorber and the measuring cell, said sectors being associated with means for selecting the wavelength of the beams in such a way that, as a function of the successive positions of the sectors relative to the beams, the detection means alternately receive the light transmitted by the sample and that transmitted by the absorber, the latter being such that it can independently absorb radiations of different wavelengths transmitted by the source and corresponding to the wavelength of the radiations absorbed by the components of the solution; means for comparing the energies of the modulated beams connected to detection means, wherein the modulation means are positioned directly behind the cell along the path of the divided measuring beam and immediately behind the absorber element on the path of the reference beam, the means for dividing the beam of the source being arranged in such a way that the measuring beam is converged on the cell.

BRIEF DESCRIPTION OF THE DRAWINGS

The invention is described in greater detail hereinafter relative to non-limitive embodiments and the attached drawings, wherein show:

FIG. 5b a profile view of the cell of FIG. 5a.

DETAILED DESCRIPTION OF THE PREFERRED EMBODIMENTS

Figure 1A:
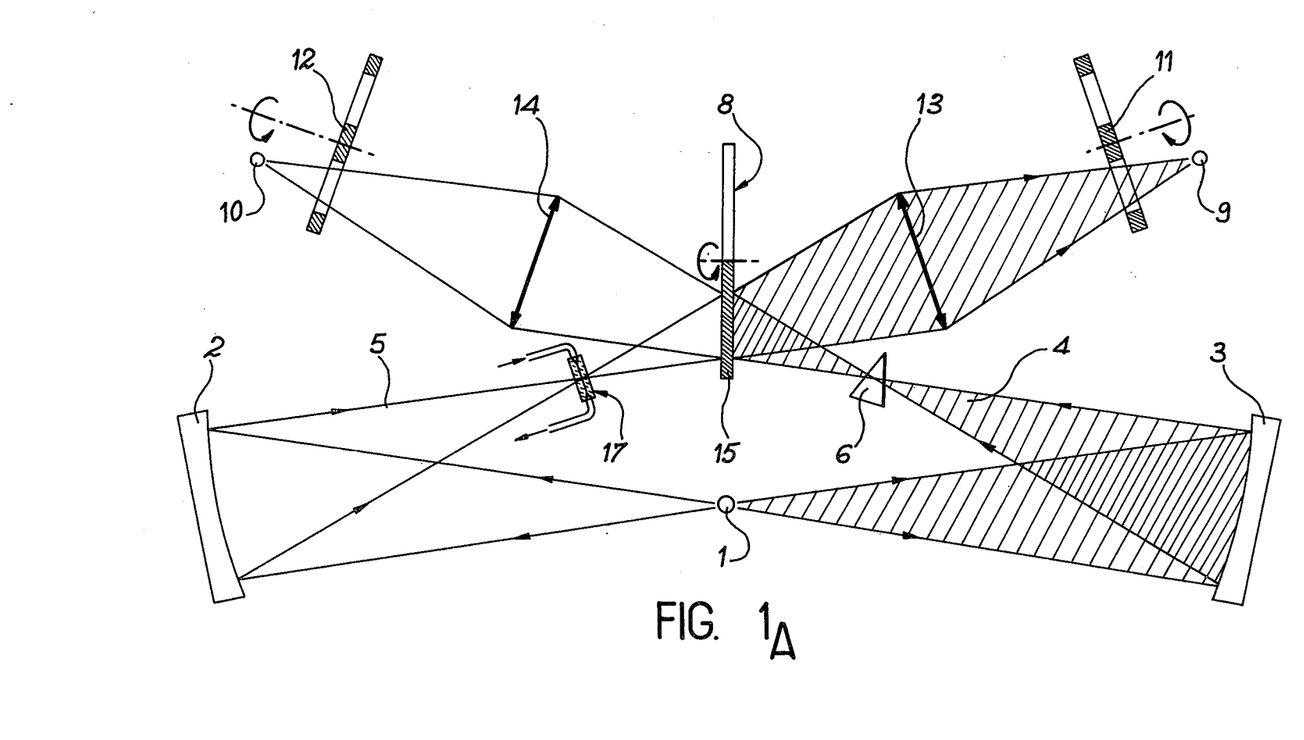
FIG. 1a a diagram showing a construction of the spectrum analyser according to the invention in a first operating sequence.
Figure 1B:
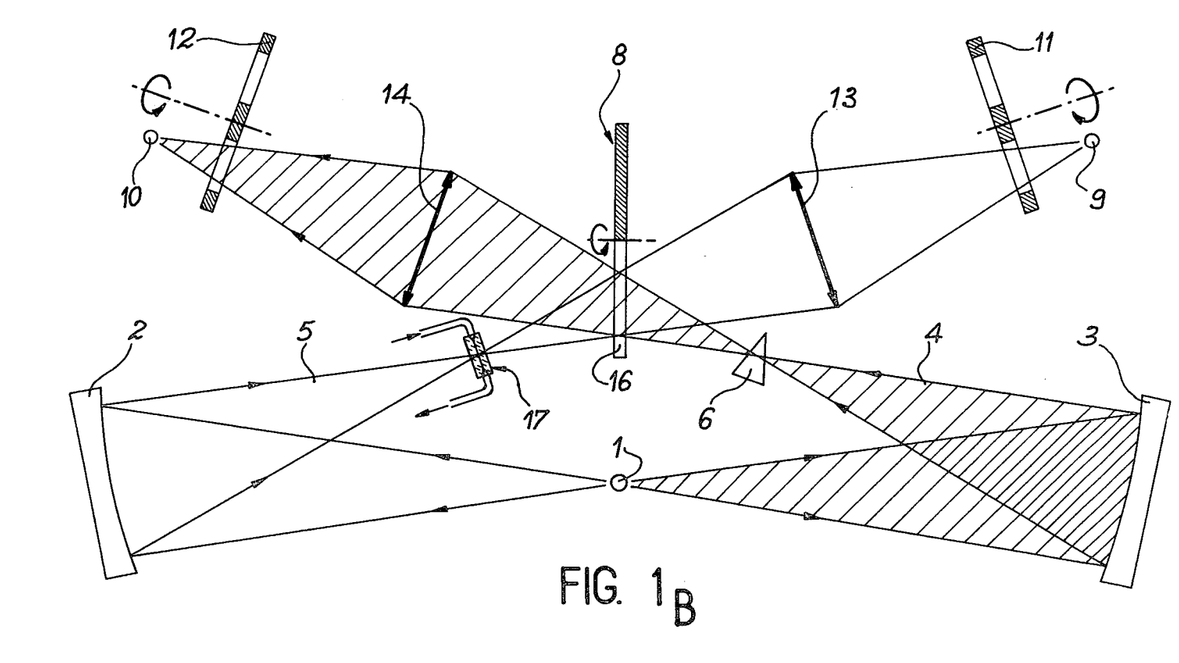
FIG. 1b a diagram showing an embodiment of the spectrum analyser according to the invention in a second operating sequence.

With reference to FIGS. 1a and 1b, the spectrum analyser according to the invention is diagrammatically shown in its first and second operating sequences. This analyser comprises a light source 1 and means 2, 3 making it possible to divide the light beam of the source into a reference beam 4 and a measuring beam 5 which are respectively transmitted to a reference absorber element 6 and to the sample to be analysed constituted for example by a solution 7 contained in a cell 17, whose plane is perpendicular to the axis of the bem traversing it. The measuring beam 5 directly traverses the cell 17 and the solution contained therein. Means 2 and 3 which make it possible to divide the beam transmitted by the source are arranged and constituted in such a way as to converge the measuring beam of cell 17 and the reference beam onto the absorber element. This analyser also comprises modulation means 8 for the reference beam 4 and measuring beam 5 after they have passed through the absorber and the solution. These modulation means which are arranged directly behind the cell and behind the absorber are constituted by a rotary disk carrying alternate transparent and bireflecting sectors. Detection means constituted by photosensitive cells 9 and 10 make it possible to detect the energies of each of the modulated beams after passing through the reference absorber 6 and the cell 17. Means 2, 3 making it possible to transmit the reference and measuring beams to the reference absorber 6 and to the solution 7 are constituted for example by concave mirrors. The two concave mirrors make the beams 4, 5 converge symmetrically with respect to the rotary disk in such a way that the measuring beam converges on cell 17 containing the solution and the reference beam converges on the absorber. In the first embodiment of the analyser according to the invention the beams traverse interferential filters 11, 12 after passing through lenses 13, 14. These filtered beams are then focused on the photosensitive detectors 9, 10, each corresponding to one of the two wavelengths $\lambda_1$ and $\lambda_2$ of the components of the sample to be analysed. In the case of the first sequence, a bireflecting sector 15 of rotary disk 8 is located on the optical path of the beams. The beam 4 is reflected onto detector 9 and beam 5 onto detector 10. Concave mirrors 2, 3 have a diameter greater than 80 mm and a relatively short focal length, preferably equal to or below 250 mm in such a way that the value of the ratio of the focal length to the diameter is between 1 and 3.

In the case of the second sequence, a transparent sector 16 of disk 8 is located on the path of the beams and permits the passage of reference beam 4 which strikes detector 10 and measuring beam 6 which strikes detector 9. The transparent cell 17 containing the solution 7 to be analysed is located on the optical path of measuring beam 5 at the convergence position of said beam. It is assumed to contain a solution of two components $E_1$ and $E_2$ which respectively absorb radiations of wavelengths $\lambda_1$ and $\lambda_2$. When the alternate transparent and bireflective sectors of the disk pass in front of each of the reference and measuring beams, each detector alternately receives the light transmitted by the cell containing the solution and that transmitted by the reference absorber positioned on the reference beam path 4. Thus, detectors 9, 10 supply alternating signals phase-displaced by 180° or 90°, depending on whether the rotary member has 2 or 4 sectors. As will be shown in greater detail hereinafter, these signals are amplified and then recorded either directly to obtain the transmission $I/I_O$ or after logarithmic linear transformation to obtain the optical density Log. $I_O/I$. The positioning of the cell at the convergence position of the measuring beam has the advantage for a maximum light energy of the beam traversing the sample of making it possible to obtain an almost point image on the cell, making it possible to considerably reduce the dimensions of the cell. This can very advantageous when performing a continuous determination on a circulating fluid, because the transit time of the solution in the cell is reduced and this leads to a reduction in the analyser response time. Moreover, the positioning of the rotary disk immediately behind the cell on the path of the measuring beam without a deflecting member such as a mirror prevents any significant loss in the light energy having to pass through the solution to be analyzed. As a result, the analyser has an increased sensitivity compared with known apparatuses.

Figure 2A:
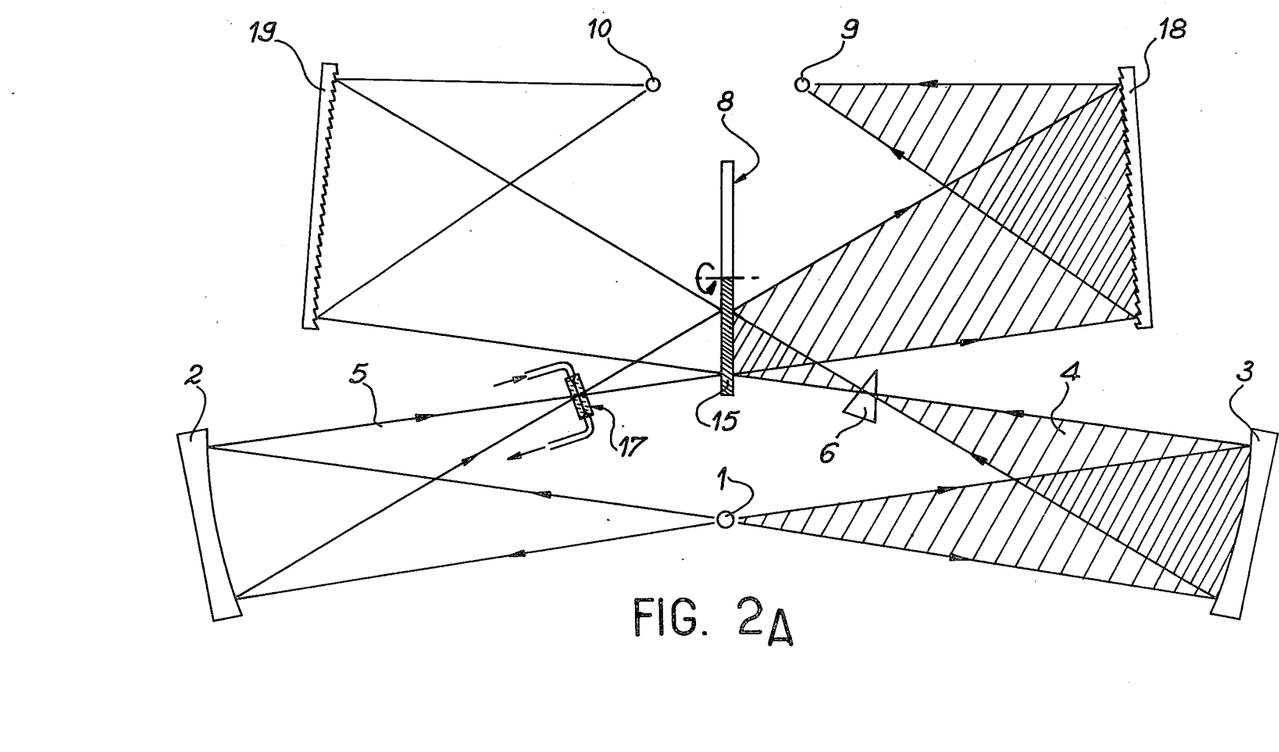
FIG. 2a diagram showing another embodiment of the spectrum analyser according to the invention in a first operating sequence.
Figure 2B:
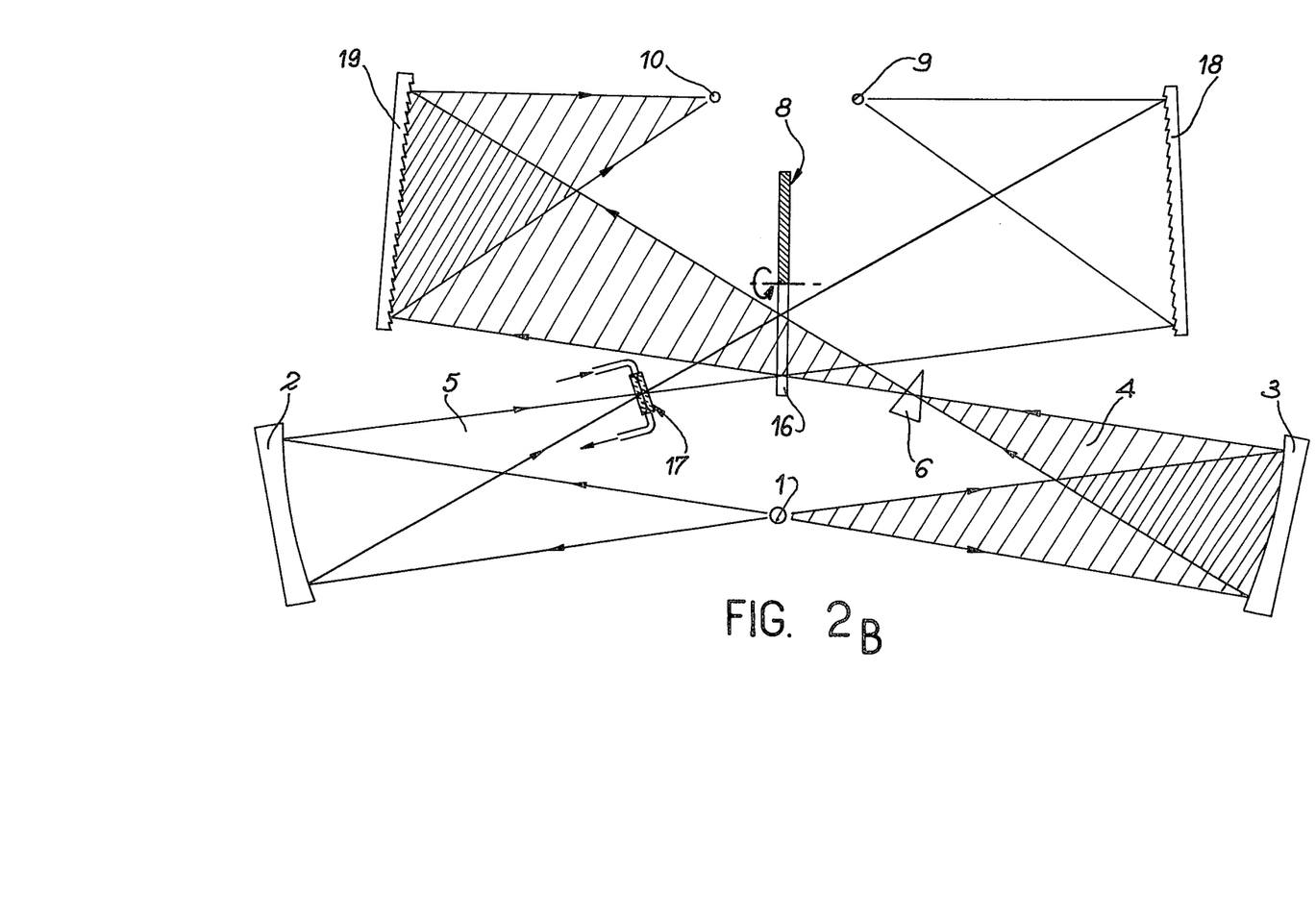
FIG. 2b a diagram showing another embodiment of the spectrum analyser according to the invention in a second operating sequence.

The selection means of the wavelengths of the beams, which comprised interferential filters in FIGS. 1a and 1b, are constituted by concave diffractions gratings 18, 19 in FIGS. 2a and 2b, which show another embodiment of the analyser according to the invention for first and second operating sequences. The concave diffraction gratings 18, 19 focus light onto detectors 9, 10. The rotation of these gratings about their axis makes it possible to simultaneously scan two spectral regions of wavelengths $\lambda_1$, $\lambda_2$. This embodiment of the analyser according to the invention offers the same possibilities as the first embodiment, but the luminosity and sensitivity are slightly inferior.

The analyser described hereinbefore with reference to the preceding drawings makes it possible to measure the absorption by a component $E_1$ of a radiation of wavelength $\lambda_1$ due to detector 9 compared with a reference absorber $\lambda_1$. In the same way, it permits the measurement of the absorption by a component $E_2$ of a radiation of wavelength $\lambda_2$ compared with that of a reference absorber $\lambda_2$ by means of detector 10. As stated hereinbefore, the reference absorber can be positioned at the convergence location of the reference beam, but said absorber can also be positioned at any other point on the reference beam between rotary disk 15 and mirror 3. In the represented embodiments, it has been assumed that the detectors were in each case sensitive to one wavelength or that the interferential filters were interposed on the path of the beams reaching each detector in such a way as to select the wavelengths of the radiations absorbed by the components of the solution. In certain analyses, the absorption of the solvent is the same for two different wavelengths. In this case, only one and not two absorbers need be provided for these two wavelengths. It is also possible to carry out a premonochromatic filtering of the light transmitted by the source by arranging a not shown monochromatic filter on the beam transmitted by the source. Thus, by reducing the energy density of the beam traversing the measuring cell, it is possible to prevent damage to heat-sensitive samples. This monochromatic filter permits the passage of wavelengths of useful radiation, but also largely absorbs the remainder of the spectrum.

Figure 3:
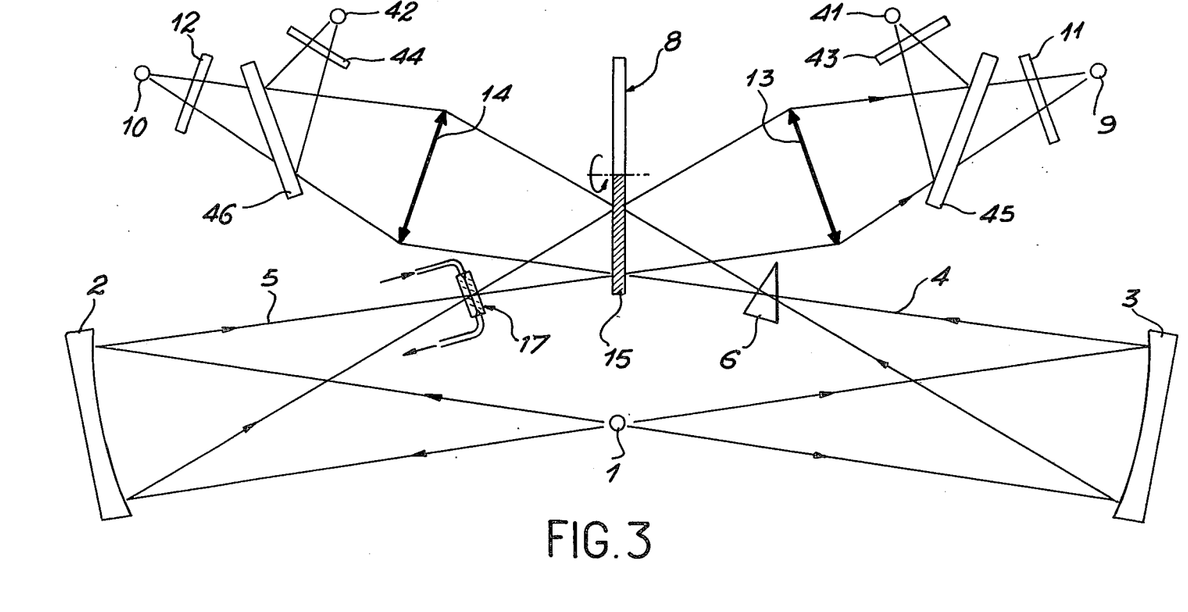
FIG. 3 another embodiment of the analyser according to the invention.

FIG. 3 shows another embodiment of an analyser according to the invention in which the same elements carry the same references as in the previous drawings. In this case, the analyser comprises a third and fourth detector 41, 42, which are respectively sensitive to wavelengths $\lambda_3$ and $\lambda_4$. Compared with the previous embodiments, the wavelength selection means also incorporate a filter 43 associated with the third detector 41 and permitting the passage of radiation of wavelength $\lambda_3$ and another filter 44 associated with the fourth detector 42 and permitting the passage of radiation of wavelength $\lambda_4$. A first dichroic plate 45 is placed between the modulation means 8 and the filters 11 and 43 associated with the first and third detectors 9, 41. A second dichroic plate 46 is placed between the modulation means 8 and the second and fourth detectors 10, 42. In this embodiment, after modulation, the divided beams converge on each of the detectors via each of the dichroic plates. In this embodiment, it is possible to ensure an almost simultaneous measurement of the four dyes dissolved in the solution to be analysed. The rotary disk 8 has four 90° sectors, two sectors being full, whilst the other two sectors are empty. At a time $T_1$, the second and third 10, 42 receive the beams which have traversed the measuring cell 17, whilst the first and third detectors receive the beams which have traversed the reference absorber 6. At a time $T_2$ corresponding to a phase displacement of 90° of the beam compared with time $T_1$, the second and fourth detectors 10, 42 receive the beams which have traversed the reference absorber 6, whilst the first and third detectors receive the beams which have traversed the measuring cell 17. In this arrangement, as in the previous arrangements, the measurements are simultaneous on the first and third detectors or on the second and fourth detectors. In all the known apparatuses, these measurements are separated in time, as a function of the modulator speed.

Figure 4:
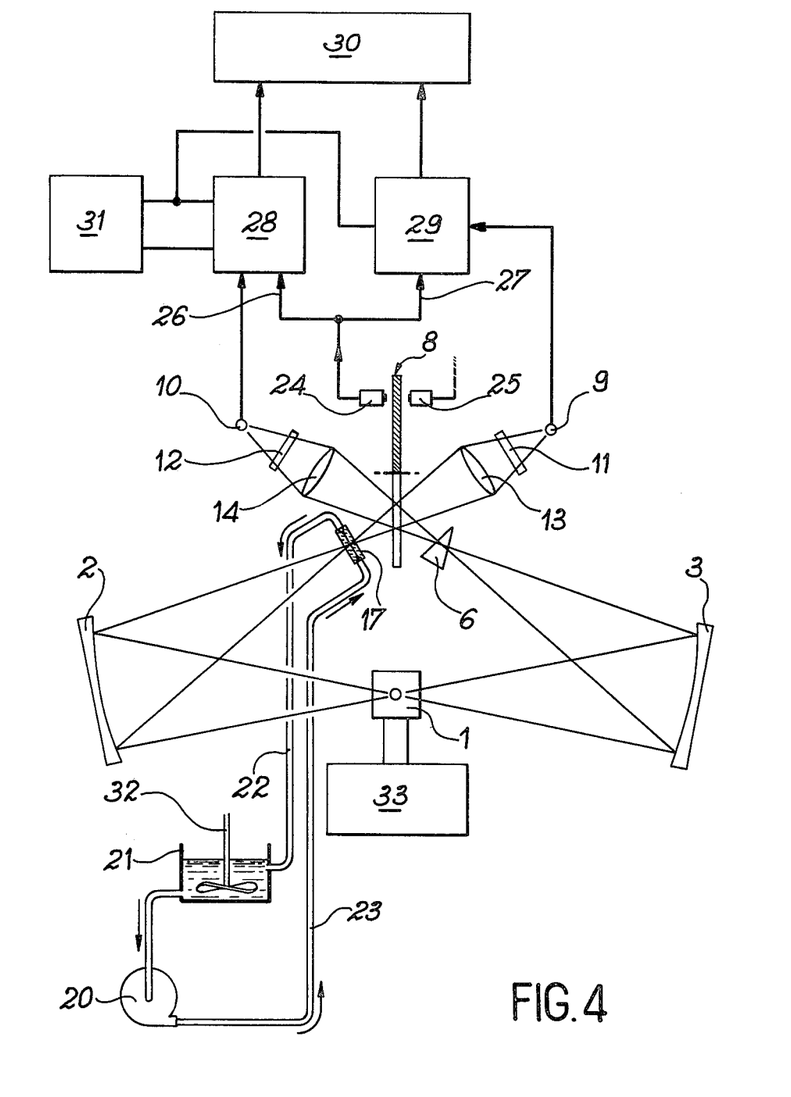
FIG. 4 a more detailed view of the spectrum analyser diagrammatically shown in FIG. 1.

In FIG. 4, the analyser of FIGS. 1a and 1b is shown in a more detail manner. Cell 17 which contains solution 7 is connected to a pump 20 by means of a reservoir 21 which receives the solution to be analysed. Said reservoir and said pump, by means of pipe 22, 23, ensure a continuous circulation of the solution to be analysed in cell 17. A stirrer 32 can be provided for homogenising the solution circulating in cell 17. The light source 1 is a very stable source, whose drift and ripple are automatically compensated. This source is supplied with direct current by a stabilised supply source 33. The lamp is, for example, of the air-cooled halogen type and has the special feature of transmitting a continuous radiation in the ultraviolet, visible and infrared regions. It is also possible to use other sources having this property such as glass-jacketed tungsten lamps, certain xenon or mercury spectral lamps and certain gas or solid lasers. The two mirrors 2, 3 ensure the combination of the measurement and reference beams on the rotary disk 8. The bireflecting sectors are constituted by mirrors having two reflecting faces on either side of the disk. The number of sectors varies as a function of the modulation frequency of the reference and measuring beams. This frequency is selected as a function of the frequency responsse of the detectors.

In order to improve the detection conditions of electrical signals of neighbouring amplitudes and in order to take account of the fact that the alternative signals supplied by the photosensitive detectors can be considerably amplified, the rotary sector can be associated with a photodiode 24 and with a lamp 25 which lights up said photodiode in such a way that the latter synchronizes the detection as a result of circuit 26, 27. Detectors 9, 10 are selected in such a way that they have optimum sensitivity and noise level characteristics at the wavelengths used. These detectors 9, 10 are respectively connected to amplification circuit 28, 29, each having a preamplifier and an amplifier with synchronous detection, transmitting to a voltmeter or millivoltmeter 30 having two channels of known type the amplified signals from detectors 9, 10. Recorder 30 makes it possible to obtain two simultaneous recording curves representing either the transmission or the absorption of the solution due, in the latter case, to two supplementary amplifiers of the logarithmic response type. The amplification circuit 28, 29 can obviously permit the observation of analysis curves on an oscilloscope 31.

The reference absorber can be constituted by a cell containing only the solvent, which is a particularly satisfactory solution. It can also be constituted by neutral wedges which are absorbant at the wavelengths $\lambda_1$ and $\lambda_2$ and in this case the introductional removal of the reference absorbers 6 can either be carried out manually or automatically. In the latter case, after prior amplification and as a function of the detected phase, the electrical current from each of the said detectors 9, 10 can actuate a servomotor which advances or retracts with respect to the reference beam the neutral wedges serving as reference absorbers. In this case, the positions of the neutral wedges correspond to each of the transmission wavelengths of the studied samples. Obviously, in this case a double recording can be coupled with a reading potentiometer directly connected to the servomotor which drives the neutral wedges. The quality of recording essentially depends on the linearity of the displacement of the neutral wedges. It is obvious that the different circuits described hereinbefore and which are applied to the analyser of FIG. 1 can be applied to the other embodiments of the analyser according to the invention.

Figure 5A:
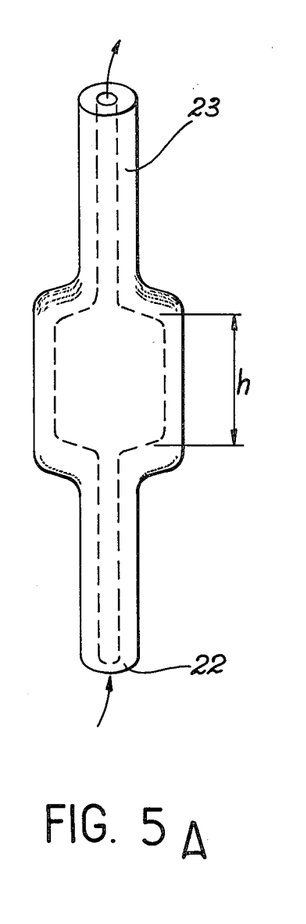
FIG. 5a a front view of a cell belonging to the spectrum analyser and which is to receive the solution to be analysed.

With reference to FIG. 5a, cell 17 is shown in front view and receives the solution on which the measurements at two different wavelengths are performed. It is transparent to wavelengths $\lambda_1$ and $\lambda_2$ and permits a uniform and undisturbed flow of the fluid. Its optical thickness is approximately 3/10 mm, when the apparatus is in accordance with the requirements of the medical problem taken as an example, because blood is highly absorbant at the two measuring wavelengths.

Two types of cells can be used, namely a fluorine or corundum cell on the one hand or a transparent silica cell of four microns on the other. Pipes 22, 23 make it possible to circulate the solution within the cell. This cell has the main advantage of being highly resistant to cleaning with strong acid as well as to drying at high temperatures. In the part struck by the measuring beam, it has a limited height h which is equal to or below 10 mm and with a width equal to or below 6 mm.

Figure 5B:
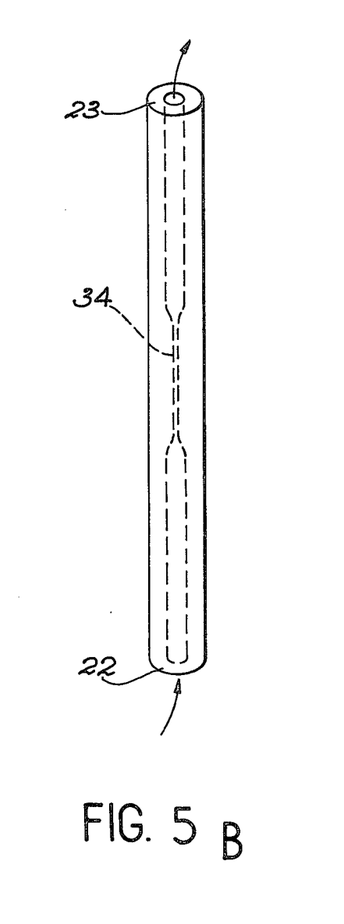

FIG. 5b shows a profile view of the cell. The optical thickness of the cell is approximately 0.3 mm in the measuring beam impact zone 4.

The invention makes it possible to achieve the objections referred to hereinbefore. There are in fact several possibilities for the use of the apparatus. The analyser can be used either as a double beam spectrometer, or as a dosing apparatus in the optical range of the electromagnetic radiation. It can also function as two double beam spectrometers coupled into one or as two dosing apparatuses, or a coupled double beam spectrometer and a dosing apparatus. Moreover, its sensitivity is very high compared with known apparatuses for the same wavelength range. Thus, the analyser according to the invention adopts a doubly differential system, which is not the case with a conventional dosing apparatus having to compare solutions which respectively absorb different wavelengths. This analyser makes it possible to compare high absorbant solutions of velocity above 2 with accuracies of the order of 1 part per million compared with several hundred parts per million in the case of a known dosing apparatus. The reference absorber can be common or specific to each of the solutions investigated, which obviates any possible error due to the nature of the solution. The synchronous modulation with, as the reference frequency, that of the rotary mirror makes it possible to improve the detection conditions and the signal-to-noise ratio. The photosensitive detectors simultaneous receive data coming respectively from the measuring cell and the reference absorber, whereby the latter can also be constituted by a cell. In the infrared region, the absorptions of carbon dioxide and water vapour are automatically compensated because the optical path on the four channels can be regulated so as to be strictly identical. This compensation regulation can be simultaneously checked on the four channels for a water vapour or carbon dioxide band by rebalancing the signals received on the detectors. There is only one photon source and all the stability, drift and ripple variations are automatically compensated. It is possible to simultaneously record a number of spectra at different speeds or at different positions of the wavelength of the spectrum in order to follow the development of two characteristic bands of a solution such as the simultaneous isotopic determinations of water vapour and deuterium oxide or of different solutions or even determinations in polarized light on one of the solutions and natural light on the other.

Premonochromatic filtering can be obtained by a type 89B or type 1A filter marketed by WRATTEN placed on the measuring beam in front of the cell, for example immediately in front of the latter.

The analyser intended more particularly for the simultaneous dosage of heavy water and indocyanine green in the blood has the following technological characteristics:
  diameter of mirrors: 100 mm
  numerical aperture: F/2.5
  power of the source: 100 watts
  optical thickness of the cell: $\leq 5/10$ mm
  volume of the cell: 25 mm$^3$
  values of the simultaneous sensitivities in a blood flow and for a time constant of 0.3 seconds, 15 ppm for the water at $4\mu$, 0.1 mg/l of indocyanine at $0.8\mu$.

The invention is not limited to the embodiments described and represented hereinbefore and various modifications can be made thereto without passing beyond the scope of the present invention.

What is claimed is:

1. A spectrum analyser for the light absorption of a solution comprising a small transparent measuring cell having a thickness less than 5/10 mm, a height at most equal to 10 mm and width at most equal to 5 mm. containing the solution; means connected to the cell for circulation of the solution; a light source; means for dividing the beam of light of the source into two beams, one being the reference beam and the other the measuring beam transmitted respectively to a reference absorber element and to the measuring cell; means for selecting the measuring wavelength; means for modulating the reference and measuring beams which have respectively traversed the absorber element and the measuring cell; means for detecting the energies of each of the modulating beams after they have traversed the reference absorber element and the sample; the modulation means comprising alternate transparent and bi-reflecting sectors in front of each of the beams which have passed through the reference absorber and the measuring cell, said sectors being associated with means for selecting the wavelength of the beams in such a way that, as a function of the successive positions of the sectors relative to the beams, the detection means alternately receive the light transmitted by the sample and that transmitted by the absorber, the latter being such that it can independently absorb radiations of different wavelengths transmitted by the source and corresponding to the wavelength of the radiations absorbed by the components of the solution; means for comparing the energies of the modulated beams connected to detection means, wherein the modulating means are positioned directly behind the cell along the path of the divided measuring beam and immediately behind the absorber element on the path of the reference beam, the means for dividing the beam of the source being arranged in such a way that the measuring beam is converged on the cell.

2. An analyser according to claim 1, wherein the thickness of the solution in the cell level with the impact point of the measuring beam on said cell has a capillary dimension.

3. An analyser according to claim 2, wherein the detection means comprise two photosensitive detectors, the first of these detectors being sensitive to a radiation of wavelength $\lambda_1$ and the second detector being sensitive to a radiation of wavelength $\lambda_2$.

4. An analyser according to claim 3, wherein the means for selecting the wavelength of the beam comprise a filter associated with the first detector and permitting the passage of radiation of wavelength $\lambda_1$ and the filter associated with the second detector and permitting the passage of radiation of wavelength $\lambda_2$.

5. An analyser according to claim 4, wherein it also comprises third and fourth detectors sensitive respectively to radiation of wavelengths $\lambda_3$ and $\lambda_4$, the wavelength selection means also comprising a filter associated with the third detector and permitting the passage of radiation of wavelengths $\lambda_3$ and another filter associated with the fourth detector and permitting the passage of radiation of wavelength $\lambda_4$, a first dichroic plate being placed between the modulation means and the filters associated with the first and third detectors and a second dichroic plate being placed between the modulation means and the second and fourth detectors.

6. An analyser according to claim 2, wherein a monochromatic filter is associated with a source.

7. An analyser according to claim 3, wherein the wavelength selection means of the beam comprise a first concave diffraction grating which focuses radiation of wavelength $\lambda_1$ onto the first detector and a second concave diffraction grating which focuses radiation of wavelength $\lambda_2$ onto the second detector.

8. An analyser according to claim 7, wherein each of the concave gratings is provided with means permitting a rotation about its axis.

9. An analyser according to claim 1, wherein the alternate transparent and semi-bireflecting sectors are carried by a rotary disk.

10. An analyser according to claim 9, wherein the comparison means comprise, for each photosensitive detector, a voltage amplification circuit connected to said detector and incorporating a synchronous preamplifier and amplifier.

11. An analyser according to claim 10, wherein the amplifier is connected to a recorder of the transmission measurements.

12. An analyser according to claim 11, wherein the amplifier is connected to the recorder via a logarithmic linear conversion circuit for the optical density measurements.

13. An analyser according to claim 11, wherein the comparison means are linked with the beam modulation means via a control circuit which permits, as a function of the sectors present in front of the beams, the synchronization of the voltage detectors.

14. An analyser according to claim 12, wherein the cell is transparent to the measuring wavelength.

15. An analyser according to claim 1, wherein the light source transmits radiation varying from the ultraviolet to the infrared.

16. An analyser according to claim 1, wherein the cell is transparent to radiation varying from ultraviolet to the infrared.

17. An analyser according to claim 1, wherein the means for dividing the beam of the source are constituted by concave mirrors, whose diameter exceeds 80 mm and whose focal length is at the most equal to 250 mm.

18. An analyser according to claim 17, wherein the reference beam also converges on the absorber.

19. An analyser according to claim 17, wherein the ratio of the focal length to the diameter is between 1 and 3.

* * * * *